United States Patent [19]

Bilibin

[11] Patent Number: 4,734,252
[45] Date of Patent: Mar. 29, 1988

[54] NUCLEAR REACTOR SHUTDOWN CONTROL ROD ASSEMBLY

[75] Inventor: Konstantin Bilibin, North Hollywood, Calif.

[73] Assignee: The United States of America as represented by the United States Department of Energy, Washington, D.C.

[21] Appl. No.: 894,224

[22] Filed: Aug. 7, 1986

[51] Int. Cl.$^4$ .............................................. G21C 7/12
[52] U.S. Cl. .................... 376/336; 376/233; 403/325; 403/327; 285/316; 285/187
[58] Field of Search .................. 376/336, 337, 233; 285/316, 277, 187; 403/32, 325, 327, 328

[56] References Cited

U.S. PATENT DOCUMENTS

| | | | |
|---|---|---|---|
| 3,038,846 | 6/1962 | Yeomans et al. | 376/233 |
| 3,088,903 | 5/1963 | Firth | 204/193.2 |
| 3,096,111 | 7/1963 | Myhre | 376/233 |
| 3,147,188 | 9/1964 | Campbell | 176/35 |
| 3,228,847 | 1/1966 | Parkinson et al. | 176/35 |
| 3,257,286 | 6/1966 | Ryon et al. | 176/35 |
| 3,347,747 | 10/1967 | West et al. | 176/35 |
| 3,721,462 | 3/1973 | Pawlitzki | 376/233 |
| 3,761,117 | 9/1973 | Shendure | 285/277 |
| 3,992,257 | 11/1976 | Erp et al. | 376/336 |
| 4,076,583 | 2/1978 | Ash et al. | 176/35 |
| 4,204,909 | 5/1980 | Gruggio et al. | 376/336 |
| 4,227,967 | 10/1980 | Zebroski | 176/36 R |
| 4,263,839 | 4/1981 | Akkerman et al. | 92/23 |
| 4,280,523 | 7/1981 | Norton | 285/187 |
| 4,304,632 | 12/1981 | Bhate et al. | 376/336 |
| 4,313,794 | 2/1982 | Chung | 376/352 |
| 4,405,558 | 9/1983 | Mangus et al. | 376/336 |

FOREIGN PATENT DOCUMENTS

| | | | |
|---|---|---|---|
| 732985 | 4/1966 | Canada | 285/316 |
| 1108528 | 6/1961 | Fed. Rep. of Germany | 403/325 |
| 1242209 | 4/1960 | France | 403/325 |
| 0052794 | 3/1985 | Japan | 376/233 |
| 836646 | 6/1960 | United Kingdom | 403/325 |
| 908059 | 10/1962 | United Kingdom | 376/233 |
| 915808 | 1/1963 | United Kingdom | 376/233 |

OTHER PUBLICATIONS

ANL/CT-74-10, 4/74, pp. 2, 3, 34, 35, 44, 48, 49.

Primary Examiner—Harvey E. Behrend
Attorney, Agent, or Firm—L. E. Carnahan; Roger S. Gaither; Judson R. Hightower

[57] ABSTRACT

A temperature responsive, self-actuated nuclear reactor shutdown control rod assembly 10. The upper end 18 of a lower drive line 17 fits within the lower end of an upper drive line 12. The lower end (not shown) of the lower drive line 17 is connected to a neutron absorber. During normal temperature conditions the lower drive line 17 is supported by detent means 22,26. When an overtemperature condition occurs thermal actuation means 34 urges ring 26 upwardly sufficiently to allow balls 22 to move radially outwardly thereby allowing lower drive line 17 to move downwardly toward the core of the nuclear reactor resulting in automatic reduction of the reactor powder.

15 Claims, 2 Drawing Figures

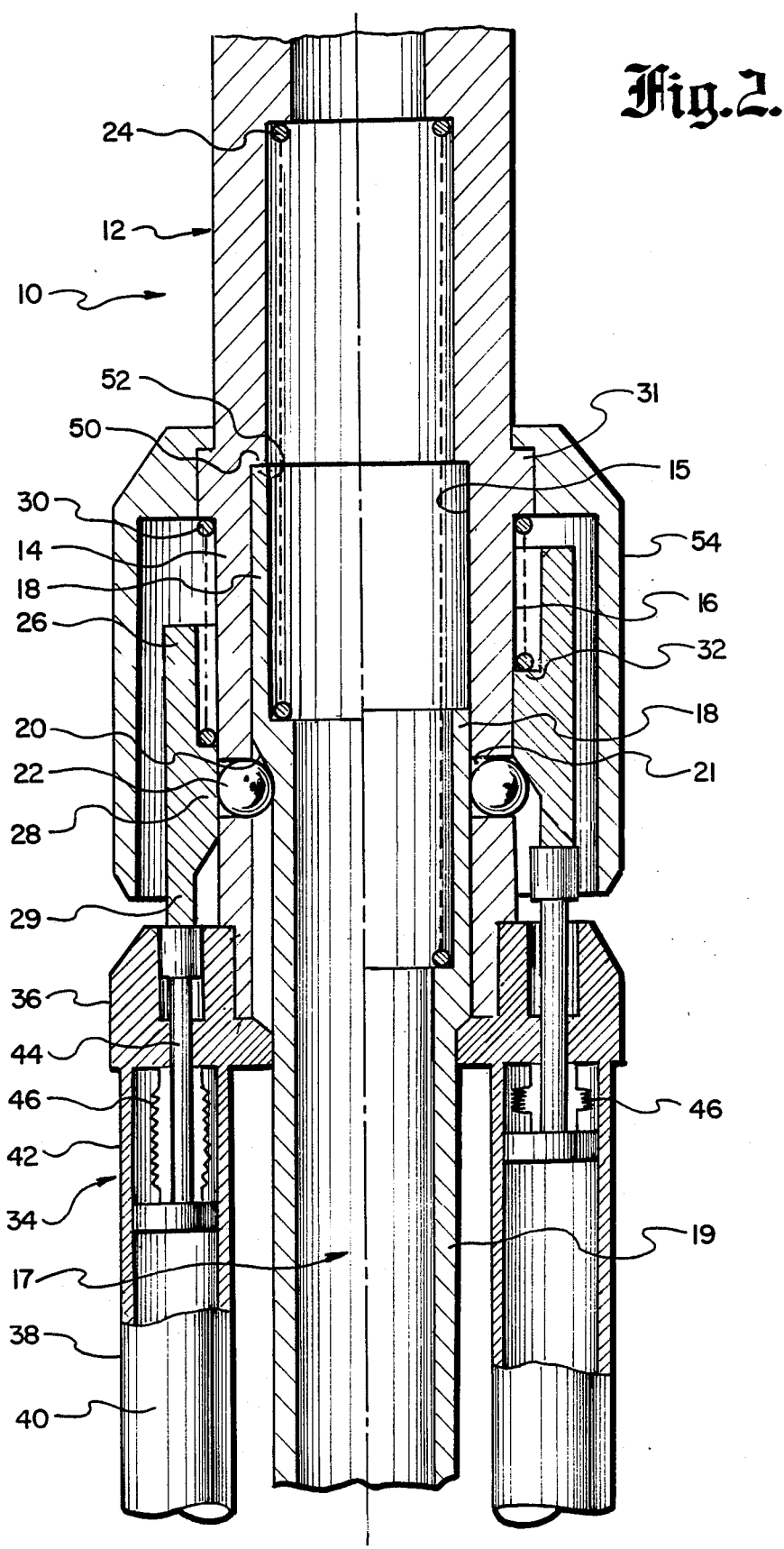

NUCLEAR REACTOR SHUTDOWN CONTROL ROD ASSEMBLY

STATEMENT OF GOVERNMENT INTEREST

The Government has rights in this invention pursuant to Contract (or Grant) No. DE-AT03-83SF11902 awarded by the U.S. Department of Energy.

BACKGROUND OF THE INVENTION

1. Field of the Invention

This invention relates to nuclear reactor shutdown mechanisms and more particularly to a temperature responsive, self-actuated nuclear reactor shutdown control rod assembly.

2. Prior Art

State of the art nuclear reactor designs include emergency shutdown systems which incorporate the introduction of some form of neutron absorbing material into the reactor core.

One type of emergency shutdown system responds to the reactor coolant pressure changes resulting from loss of coolant flow due to coolant pump stoppage. An example of an emergency shutdown system which responds to pressure changes is U.S. Pat. No. 3,228,847 issued to T. F. Parkinson which suggests a reactor control system which includes a control assembly for controlling neutronic flux. The control assembly comprises an inner tube extending from a nonactive region of the reactor into the active region, and an outer tube surrounding the inner tube and spaced therefrom. The outer tube has a closed end and the inner tube has an open end adjacent and spaced from the closed end of the outer tube. Neutron absorbing particles are positioned between the inner and outer tubes for movement along the tube under the force of flow. The neutron absorbing particles are moved out of the active region of the reactor by fluid flow and fall back into the active region under the influence of gravity when the flow is shut off.

Another example of a shutdown system which responds to reactor coolant pressure changes is U.S. Pat. No. 3,347,747 issued to J. M. West which discloses a control organization and method for a nuclear reactor. The reactor is provided with a number of laterally spaced vertical passageways in the region of the core and distributed throughout the area thereof. The passageways include a lower portion which extends generally throughout the height of the core and an upper portion which extends above the core into the reactor vessel. Positioned within and confined in each passageway is a movable means which contains a poison and which is movable from a power position within the region of the core to an upper position in the passageway, where it is generally above the core. The poison-containing means is moved by gravity to its lower position and is moved from its lower to its upper position by means of a fluid which is directed upward in the passageway.

Other systems which rely upon pressure changes include, for example, U.S. Pat. No. 3,257,286 issued to J. W. Ryon, U.S. Pat. No. 4,076,583 issued to E. B. Ash, and U.S. Pat. No. 4,313,794 issued to D. K. Chung.

Use of systems such as the foregoing systems offer advantages over reliance solely on a control rod system. However, in all of these systems where coolant pressure is relied upon to cause the absorber elements to move into the core, any residual fluid flow, even though it may be below the minimum for safe operation of the reactor, acts to retard the fall of the absorber elements.

Furthermore, these pressure-activated systems will not react in the case of reactor overpower accidents because reactor coolant pressure does not drop during an overpower condition.

A second type of emergency power control system responds to reactor coolant temperature. In U.S. Pat. No. 4,227,967, issued to E. L. Zebrowski, an apparatus is disclosed which comprises a series of bimetallic elongate expansion members with high and low thermal expansion coefficients which expand to primary coolant temperature rises. The expansion members are disposed in alternate relationship and connected in series alternately at their top ends and at their bottom ends. The expansion members are connected at one end to the drive line and at the other end to absorber material. When the temperature rises the expansion members elongate putting the absorber member into the reactor core.

Since the Zebrowski device is temperature responsive it reacts to loss of coolant flow due to coolant pump stoppage and also to reactor overpower conditions. Another advantage of this device is that it does not rely on mechanical features to be activated.

However, the Zebrowski device responds in a linear fashion to temperature changes in the reactor. As a result, it will respond to temperature rises well within normal operating temperature limits. This results in unwarranted and undesirable power fluctuations. Additionally, in order to get meaningful elongation out of the expansion members a multitude of members is required. The requirement of a multitude of members might make use of this apparatus prohibitive in view of the limited space within the upper structure shroud of the reactor.

OBJECTS OF THE INVENTION

A primary object of the present invention, therefore, is to provide a temperature responsive, self-actuated nuclear reactor shutdown control rod assembly.

Another object of this invention is to extend (lengthen) the control rod drive line of the nuclear reactor and hence insert the absorber into the core in a single step when the reactor coolant temperature reaches a predetermined design limit.

Another object of this invention is to provide a shutdown mechanism which is sufficiently compact to be used with contemporary reactors given their envelope limits.

Still another object of this invention is to provide a shutdown control rod assembly which remains undisturbed during normal operating conditions.

Yet another object of this invention is to provide a shutdown apparatus which is resettable only by an operator's action and then, only if the reactor coolant is at or below a normal temperature.

Other objects, advantages and novel features of the present invention will become apparent from the following detailed description of the invention when considered in conjunction with the accompanying drawing.

SUMMARY OF THE INVENTION

The present invention is a temperature responsive, self-actuated nuclear reactor shutdown control rod assembly. In its broadest sense, the shutdown control rod assembly comprises an upper drive line, a lower drive line connected to an absorber, detent means for releasably latching the lower drive line to the upper drive line and thermal actuation means in heat exchange relationship with the reactor core outlet coolant and in contact with the detent means. The actuation means cooperates with the detent means to unlatch the lower drive line when the reactor coolant approaches a predetermined shutdown temperature, thereby allowing the lower drive line to move downwardly into the core of the nuclear reactor resulting in automatic reduction of nuclear power.

In its more narrower aspects, the reactor shutdown assembly has a plurality of holders depending from the lower end of the upper drive line. Each holder contains a piston which is activated by thermally expandible fluid within the holder. When the reactor coolant temperature rises, the fluid within the holder (which is in heat exchange relationship with the reactor coolant) expands, forcing the piston to move upwardly. This upward motion is imparted to a ring disposed around the upper drive line. During normal operating temperatures a portion of the ring provides radial support for a plurality of balls which, in turn, provide support for the lower drive line. When an overtemperature condition occurs the retaining ring is urged upward sufficiently so that the balls are no longer supported in the same radial position. As a result, support of the lower drive line is lost and the drive line, with the attached absorber, moves downwardly resulting in automatic reduction of the reactor power below criticality.

Figure 1:
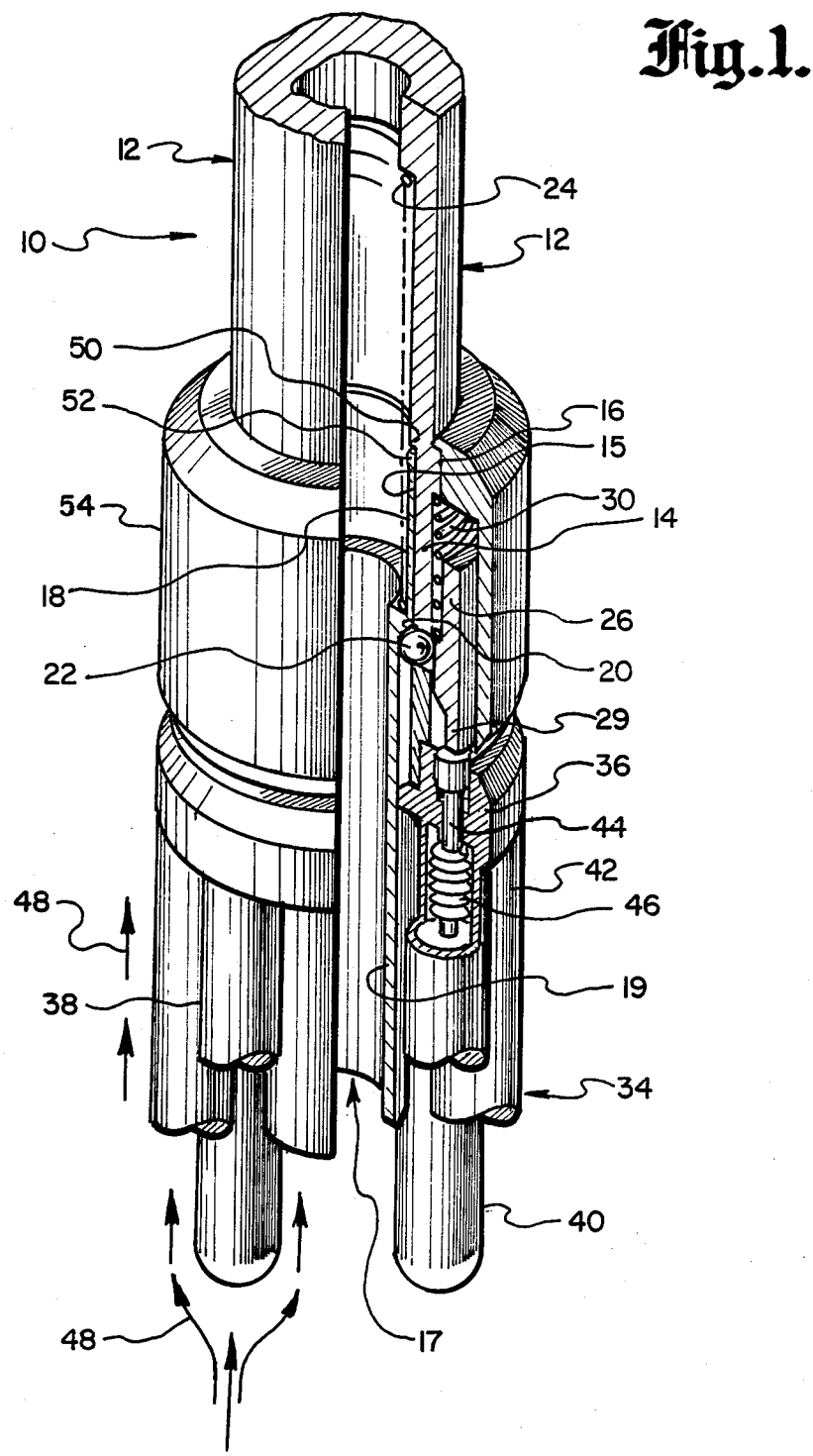
FIG. 1 is a perspective view, partially cut away, of a preferred embodiment of the nuclear reactor shutdown control rod assembly shown under normal temperature conditions in the unextended (normal) configuration.

The left side of FIG. 2 is a side elevation view of FIG. 1 taken in cross section. The right side of FIG. 2 shows the same embodiment after an overtemperature condition has been achieved and the control rod has been extended (lengthened).

DETAILED DESCRIPTION OF THE INVENTION

Referring to the Figures, the preferred embodiment of the nuclear reactor shutdown control rod assembly of the present invention is designated generally as 10. In FIG. 1 and the left side of FIG. 2 the reactor shutdown assembly 10 is shown positioned at normal reactor operating temperatures. On the right side of FIG. 2, the reactor shutdown assembly 10 is shown in the extended position following a reactor coolant outlet overtemperature condition. An upper drive line 12 of the control rod assembly 10 terminates at its lower end with a substantially cylindrical wall member 14. The wall member 14 has an inner surface 15 and an outer surface 16.

A lower cylindrical drive line 17 has an upper portion 18 with a diameter less than that of the inner surface 15 of wall member 14 and fits within wall member 14. The upper portion 18 of the upper end of lower drive line 17 has a diameter which is greater than a lower portion 19. A recess or lip 20 is formed on the outer surface of the lower drive line 17 at the juncture of the lower portion 19 and the upper portion 18. The lower end (not shown) of the lower drive line is connected to an absorber (also not shown).

The wall member 14 includes a plurality of circumferentially disposed openings 21 for containing an equal number of balls 22. Each of the balls 22 has a diameter greater than the thickness of the wall member 14. During normal operating conditions the balls 22 engage recess 20 on the lower drive line 17. Recess 20 is forced against balls 22 by a drive line extension assist spring 24.

Radial outward movement of the balls 22 is prohibited by a retaining ring 26 disposed about the outer surface 16 of wall member 14. The retaining ring 26 has a portion 28 with an inside diameter slightly larger than the outside diameter of the wall member 14. It also has a lower portion 29 with an inside diameter greater than that of portion 28. When the retaining ring 26 is raised relative to the wall member 14, by a method fully explained below, the balls 22 move radially out from the recess 20 into the lower portion 29 of the retaining ring 26. Removal of the vertical support provided by the balls 22 for recess 20 allows the lower drive line 17 to move downwardly relative to the upper drive line 12. The retaining ring 26 is forced downwardly by a ring retaining spring 30 located between radial outward extension 31 of the upper drive line 12 and a step 32 on the retaining ring 26.

An actuation assembly designated generally as 34 is utilized to push the retaining ring 26 upward in the event of an over temperature condition. The actuation assembly 34 includes a support ring 36 attached to the upper drive line 12 by a threaded joint at the lower end of wall member 14. Integral with and depending from support ring 36 are a plurality of equally spaced circumferentially disposed holders 38. The preferred embodiment shown in FIG. 1 includes six of such holders 38. A high thermal expansion fluid such as a liquid metal, e.g. Na or NaK, is contained within a lower portion 40 of each holder 38. The upper portion 42 of each holder 38 contains a piston 44 and bellows flexible seal 46. The upper end of the piston 44 is in nominal contact with the retaining ring 26 only at the normal reactor operating temperature, as shown in the left side of FIG. 2. Movement of piston 44 between normal reactor operating temperatures and refueling temperature is away from retaining ring 26, hence, no action occurs to disturb the drive line.

In the event of a reactor over temperature condition, the reactor fluid (shown by arrows 48) flowing past and around the actuation assembly 34 heats up the liquid metal inside the holders 38 and the resulting liquid metal expansion forces piston 44 to move beyond its normal operating position thus pushing the retaining ring upward. At the design limit temperature, the retaining ring 26 is moved sufficiently to introduce the lower portion 29 of retaining ring 26 to where the balls 22 are located. The balls 22 are pushed outwardly by the weight of the lower drive line 17 and the spring 24. At this point, the lower drive line and the absorber are rapidly driven down into the core of the reactor. Control for limiting the absorber insertion into the reactor core is provided by the step 20 in the lower drive line 17 when it contacts the support ring 36. Redundant utilization of holders 38 guards against a possible bellows failure and thus provides a greater assurance of the device being functional when conditions demand its performance.

The shutdown apparatus 10 is reset simply and automatically by driving the control rod assembly down. The resetting (relatching) takes place when the absorber assembly (not shown) and the attached lower drive line 17 are bottomed in the core. At this point, the upper driveline 12 continues to be driven until the expanded (lengthened) driveline length is absorbed as the surfaces designated 50 and 52 of drivelines 12 and 17 respectively make contact. The weight of the retaining ring 26 and spring 30 push the balls 22 into the space below recess 20 of driveline 17 thus capturing and locking the lower drive line 17 into position as shown on the left side of FIG. 2. Note that resetting (relatching) is possible only when the reactor collant outlet temperature returns to near normal or below.

A guard ring 54 is also utilized to prevent foreign matter from accidentally interfering with the operation of the retaining ring 26 or spring 30.

As noted, a thermally expandable liquid metal is preferred for use as the liquid in the holders. A liquid metal exhibiting high thermal expansion characteristics is most desired. It is required that this liquid have a change in specific volume greater than that of the holder material itself. A suitable holder material is stainless steel which exhibits a change in specific volume of $5.3465 \times 10^{-8}$ ft$^3$/lb per °F. Sodium, a likely liquid metal candidate, exhibits a change in specific volume of $3.2143 \times 10^{-6}$ ft$^3$/lb per °F. These properties effect the axial expansion rate of the piston as shown in the following example:

EXAMPLE

A stainless steel cylindrical holder with an inside diameter of 1.5 inches and a length of 20.25 inches is used. The temperature of the coolant surrounding the liquid Na contained in the holder rises from 1000° F. to 1200° F., i.e. $\Delta T = 200°$ F.

Since sodium has a change in specific volume of $3.2143 \times 10^{-3}$ ft$^3$/lb per °F. the volume change of the sodium is 1.2019 in$^3$. Since stainless steel has a change in specific volume of $5.3464 \times 10^{-8}$ ft$^3$/lb per °F. the volume change of the holder is 0.24964 in$^3$. Therefore, the excess sodium volume is 0.9523 in$^3$. Assuming the piston has the same cross section as the cylinder there is an axial piston motion of 0.539 in. Appropriate design of the apparatus will allow a non-linear extension of the drive line at precisely the desired temperature. It is noted that use of a smaller diameter piston will amplify its axial displacement. For example, if a 0.87 inch piston is used, under the circumstances described above there will be a displacement of 1.60 inches.

Obviously, many modifications and variations of the present invention are possible in light of the above teachings. It is therefore to be understood that, within the scope of the appended claims, the invention may be practiced otherwise than as specifically described.

What is claimed and desired to be secured by Letters Patent of the United States is:

1. In a nuclear reactor having a reactor core and a reactor coolant flowing therethrough, a temperature responsive, self-actuated nuclear reactor shutdown control rod assembly, comprising:

an upper drive line terminating at its lower end with a substantially cylindrical wall member having inner and outer surfaces, said wall member having a plurality of circumferentially disposed openings adjacent a lower end thereof;

a lower drive line having a lower end adapted to be attached to a neutron absorber, said lower drive line having a substantially cylindrical upper end, an upper portion of the upper end having a diameter greater than a lower portion of the upper end of said lower drive line, said upper portion having a diameter less than that of the inner surface of said wall member of said upper drive line, said upper portion fitting within said wall member in the vicinity of the openings, said lower drive line having a recess formed on an outer surface thereof and interconnecting said upper portion and said lower portion thereof;

a ring movable disposed about the outer surface of the wall member of said upper drive line, said ring having a first portion with an inside diameter slightly larger than the outside diameter of said wall member, and a second portion with an inside diameter greater than that of the first portion so as to form a space between said wall member and said ring;

thermal actuation means adapted to be in heat exchange relationship with coolant in an associated reactor core and in contact with said ring, said actuation means being mounted externally of said lower drive line and secured to said wall member of said upper drive line, said actuator means providing for upward movement of said ring when reactor coolant temperature is increased; and a plurality of balls located within the openings in said upper drive line, each of said balls having a diameter greater than the thickness of the wall member of said upper drive line, the balls being normally retained radially inwardly by the first portion of said ring so that a portion of each ball protrudes radially inwardly beyond the inner surface of said upper drive line into the lower portion of the upper end of said lower drive line and adjacent the recess formed on the outer surface of said lower drive line to provide vertical support for said lower drive line at the recess;

whereby when reactor coolant approaches a predetermined design temperature said actuation means moves said ring sufficiently so that the balls move radially out from said recess and into said space formed by the second portion of said ring thereby removing said vertical support for said lower drive line such that the lower drive line moves downwardly and inserts an associated neutron absorber into an associated reactor core resulting in automatic reduction of reactor power.

2. The assembly of claim 1 wherein said thermal actuation means includes:

a support ring attached to the lower end of said upper drive line; and a plurality of spaced holders depending from a lower end of said support ring and in contact with the reactor coolant, each of said holders having a lower portion containing a thermally expandable fluid and an upper portion sealed from the lower portion, said upper portion containing a piston which is responsive to fluid expansion within the lower portion, the piston being in contact with said ring which is disposed about the outer surface of the wall member of the upper drive line.

3. The assembly of claim 2 wherein a high thermal expansion liquid metal is contained within the lower portion of each holder.

4. The assembly of claim 3, wherein said liquid metal is selected from the group consisting of Na and Nak.

5. The assembly of claim 2 wherein the lower portion of said holder is sealed from the upper portion of said holder by a bellows flexible seal.

6. The assembly of claim 1 further including drive line extension assist spring means mounted in compression along a portion of the inner surface of the upper drive line for forcing the lower drive line from the upper drive line and thereby assisting the downward movement of said lower drive line when a reactor coolant overtemperature condition occurs.

7. The assembly of claim 1 further including ring retaining spring means mounted in compression along a portion of the outer surface of said upper drive line, between a radial outward extension on said outer surface and a stepped portion of said ring, said ring retaining spring means maintaining said ring snugly against said actuation assembly.

8. The assembly of claim 1 further including a ring guard disposed about the periphery of said ring to prevent any foreign matter from accidentally interfering with the operation of said ring.

9. The assembly of claim 1 wherein said thermal actuation means includes:

holding means for containing a quantity of liquid metal having a relatively high rate of change in specific volume; and urging means which is activatable by the expansion of said liquid metal, said urging means cooperating with said ring to unlatch said lower drive line when design reactor coolant temperature is reached.

10. The assembly of claim 9 wherein said liquid metal is Na.

11. The assembly of claim 9 wherein said urging means includes piston and seal means, said piston and seal means being located intermediate said quantity of liquid metal in said holding means and said ring, said piston being moved by expansion of said liquid metal.

12. The assembly of claim 9 wherein said holding means comprises a cylindrical holder.

13. The assembly of claim 12 wherein said holder is comprised of stainless steel.

14. The assembly of claim 12 wherein said holder comprises a lower portion and an upper portion, said lower portion containing said liquid metal and said upper portion containing said urging means.

15. The assembly of claim 14 wherein said urging means comprises a piston, said piston being sealed from said liquid metal by a bellows flexible seal.

* * * * *